Mar. 20, 1923.
O. C. HAPPEL
1,449,039
SPRING WHEEL
Filed Dec. 17, 1921
2 sheets-sheet 1
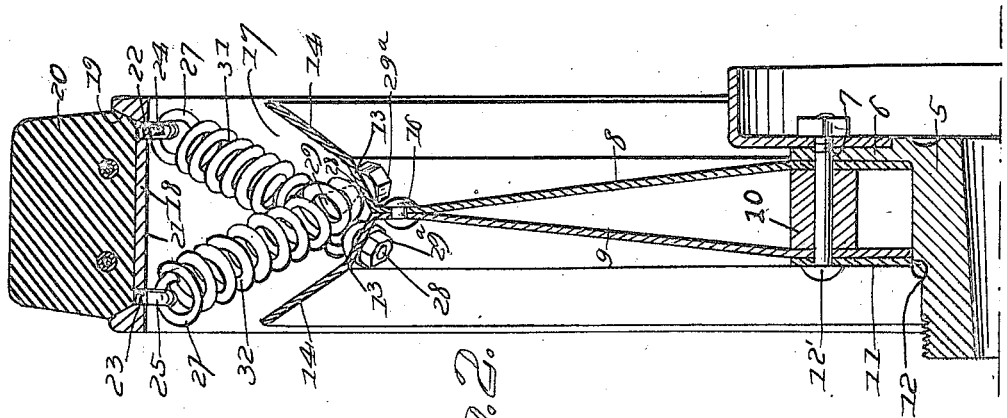
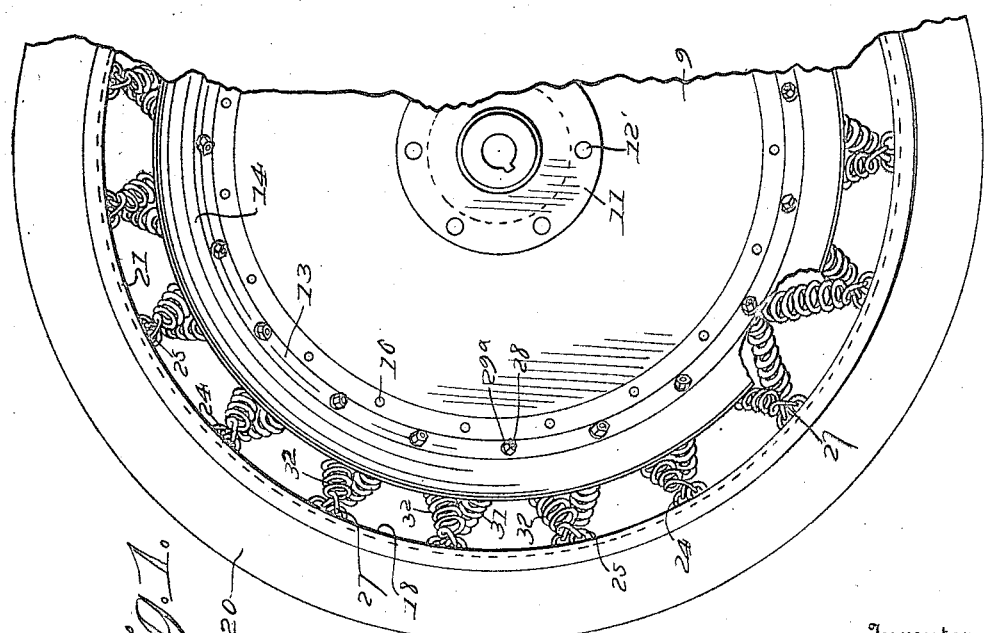
Inventor
Omar C. Happel,
By Watson E. Coleman
Attorney Mar. 20, 1923.  O. C. HAPPEL  1,449,039
SPRING WHEEL
Filed Dec. 17, 1921  2 sheets-sheet 2
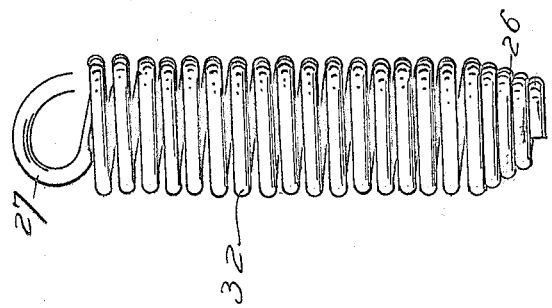
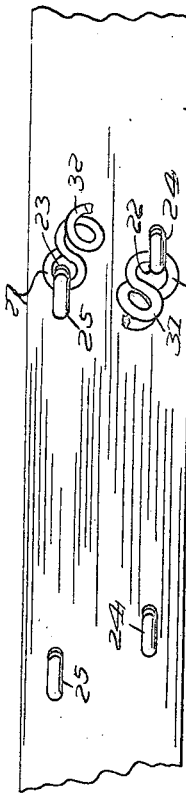
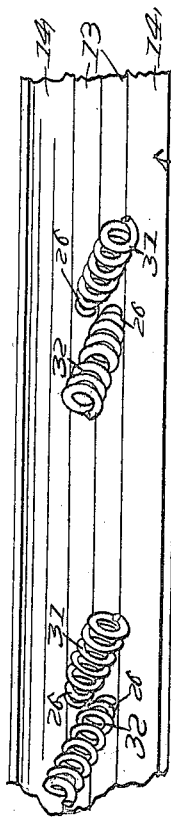
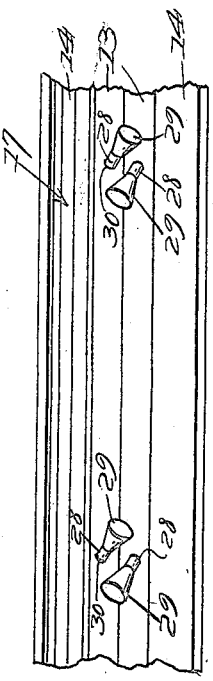
Inventor
Omar C. Happel,
By Watson E. Coleman
Attorney Patented Mar. 20, 1923.

1,449,039

UNITED STATES PATENT OFFICE.

OMAR C. HAPPEL, OF LOUISVILLE, KENTUCKY.

SPRING WHEEL.

Application filed December 17, 1921. Serial No. 523,027.

*To all whom it may concern:*

Be it known that I, OMAR C. HAPPEL, a citizen of the United States, residing at Louisville, in the county of Jefferson and State of Kentucky, have invented certain new and useful Improvements in Spring Wheels, of which the following is a specification, reference being had to the accompanying drawings.

This invention relates to spring wheels and has for its object to provide a wheel of this character wherein the hub member is properly suspended or supported in spaced relation to the tread or felly member, without danger of damage to the parts of the device under strain.

Another object of the invention is to provide a wheel of this character wherein the hub member is connected to the felly or tread member through the medium of bodily yieldable spoke members.

It is a further object of the invention to provide a wheel of this character wherein the hub member is connected to the tread or felly member through the medium of coil springs, said springs being disposed in angular relation to the felly or tread member and substantially to each other.

It is still a further object of the invention to provide a wheel of this character wherein the hub member is connected to the tread member through the medium of two series of springs disposed in spaced relation to each other, each series of springs extending laterally of the felly of the hub member and tread or felly member and also laterally of the opposite series of springs.

With these and other objects in view, the invention consists in the improved construction and arrangement of parts to be hereinafter more particularly described, fully claimed and illustrated in the accompanying drawings, in which:—

Figure 1 is a fragmentary elevation of a spring wheel constructed in accordance with an embodiment of the invention;

Figure 2 is an enlarged transverse sectional view of the structure shown in Figure 1;

Figure 3 is a fragmentary plan view looking at the inner face of the felly member, showing the position of the hooks;

Figure 4 is a fragmentary plan view of the channel formed by the discs, showing the relative position of the springs;

Figure 5 is a fragmentary plan view showing the position of the bolts within the channel; and Figure 6 is a detailed view of one of the springs.

Referring to the drawings, 5 designates the hub portion of the wheel adapted to receive the axle, said hub portion including the usual flange 6 having a plurality of openings 7. In connection with this conventional form of hub, there is provided a hub member or extension in the form of discs 8 and 9, said discs each having a central opening for the reception of the hub portion 5, spacing means 10 being disposed between the discs 8 and 9 adjacent the central openings of said discs so that the discs may be spaced from each other. An annular plate 11 having a central opening 12 is passed over the hub portion 5 and into engagement with the disc 9, the disc 8 being adapted to engage the flange 6. Bolts 12' are passed through the plate 11, disc 9, spacing member 10, disc 8 and the flange 6, to firlmly secure the discs to the hub member. The bolts 12' are spaced from each other annually of the hub portion. The outer edge portion of each disc is extended in angular relation to the main portion of the disc to provide a shoulder 13, the remainder of said end portion being substantially offset with respect to the main portion of the disc to provide a fender 14. The discs 8 and 9 are connected to each other by rivets 16 at the junction of the shoulder 13 with the disc so that said discs substantially converge from the hub portion 5 to the shoulders 13, while the shoulders 13 and fenders 14 cooperate to substantially provide a channel 17.

The tread or felly member 18 is of conventional form, said member having a channel 19 for the reception of a tire 20. The inner face 21 of the felly or tread member is provided with a series of openings 22 extending annularly of one edge of the tread member, while the opposite edge of the tread member is provided with a series of similar openings 23, said openings being threaded for the reception of staples or hooks 24 and 25, each series of hooks being disposed substantially in alignment with each other annularly of the tread member and in staggered relation to the hooks of the opposite series, the shanks of the hooks or staples being threaded into the openings 22 and 23.

In order to connect the hub member comprising the hub portion 5 and the discs 8 and 9 to the tread or felly member 18, a plurality of coil springs 26 are provided, each spring having a hook 27 formed on one end adapted to engage one of the hooks of the felly, while the opposite end of the spring is formed substantially conical and adapted to receive a bolt 28 having a tapering head 29 adapted to engage the inner portion of the conical end to prevent disengagement of said bolt from the spring. A nut 29$^a$ is engaged with the bolt, one face of said nut being rounded to permit adjustment of the spring. The shoulder 13 of each disc is provided with a series of openings 30, said openings being angularly disposed with respect to the shoulder.

In assembling the wheel, the series 31 of the springs 26 are connected to the hooks 24 of the felly, the opposite series 32 of the springs 26 being connected to the hooks 25. The hub member is positioned so that the openings 30 are disposed between the adjacent hook members of the felly. In view of this, the springs of the series 31 are extended substantially obliquely of the felly and the hub member and also laterally of the felly and hub member, the shanks of the bolts 28 carried by the springs of the series 31 extending through the shoulder of the disc 9, while the shanks of the bolts 28 carried by the springs of the series 32 extend through the openings in the shoulders of the disc 8. The rounded faces of the nuts 29$^a$ are substantially counter-sunk in the angularly disposed openings in said shoulders so as to substantially serve as swivels to permit self-adjustment of the springs, if necessary. In this way each of the series is not only disposed obliquely with respect to the hub member and felly member, but laterally of said hub member and felly member and also the springs of the opposite series, so that the springs of each of said series substantially cross each other but in spaced relation to each other. By this arrangement it will be noted that the springs of the series 31 are also disposed substantially in parallel relation to each other, the springs of the series 32 being likewise disposed in parallel relation to each other, the springs of the series 31 inclining in the opposite direction to that of the springs of the series 32.

The advantage of this arrangement is that when the hub member is under strain, no direct downward pull is exerted upon any individual spring, but instead, an outward and sideward pull is produced which permits each spring to function in the cushioning operation of the wheel, in addition to eliminating strain to a large extent, as well as preventing the springs at the lower portion of the wheel, when the same is under strain, from being mashed or damaged, in view of their inclined position. By the novel arrangement of the fenders 14 the greater portion of the springs are protected from contact with any object so that in the course of travel if the wheel should engage a large stone in the road there is no danger of the same damaging the springs. In addition to this, the springs are likewise protected to a large extent from the elements and also foreign matter, so that clogging of the springs is prevented.

From the foregoing it will be readily seen that this invention provides a novel form of spring wheel wherein the particular inclined arrangement of the springs permits each spring to function in the cushioning operation of the wheel, and also permits said springs to be made relatively small so that greater yielding power is possible than if the springs were made relatively long. Furthermore, the novel connection of the springs to the felly and hub member permits the same to be readily replaced by an unskilled person should this be necessary. Another important feature of this wheel is that, in view of the fenders, the springs are partially concealed so that the wheel is rendered compact and neat in appearance, the particular size of the discs 8 and 9, giving the wheel the appearance of a solid disc wheel, as only one end portion of each spring is visible.

What is claimed is:—

A wheel of the character described comprising a hub member having its outer edges formed into oppositely extending flanges, a felly member disposed in annular spaced relation to the flanges of the hub member, said flanges being positioned at the central portion of the felly, a series of spaced hooks carried by one edge of the felly, a series of springs connected at one of their ends to said hooks and extending inwardly and obliquely of the felly toward the adjacent flange of the hub member, the opposite ends of said springs being connected to the flange of the hub member remote from said edge of the felly, a second series of hooks carried by the opposite edge of the felly in staggered relation to the first mentioned series of hooks, and a second series of springs connected at one of their ends to the second series of hooks and extending inwardly and obliquely of the felly toward the adjacent flange, and in the opposite direction to that of the first mentioned series of springs, the opposite ends of the second mentioned series of springs being connected to the remaining flange of the hub member remote from the second mentioned edge of the felly, the second mentioned ends of the springs of one series being disposed closely adjacent the corresponding ends of the opposite series of springs.

In testimony whereof I hereunto affix my signature.

OMAR C. HAPPEL.